Aug. 13, 1935.  J. F. G. CHOBERT  2,011,472
FASTENING AND ASSEMBLING DEVICE
Filed May 24, 1934  3 Sheets-Sheet 1
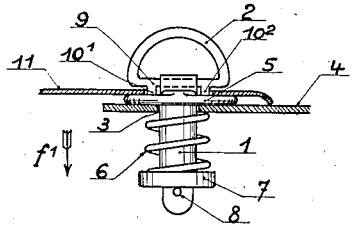
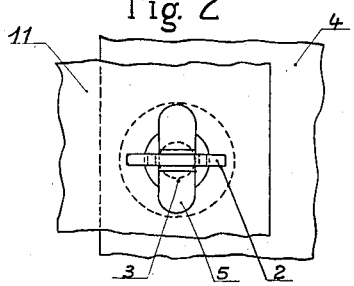
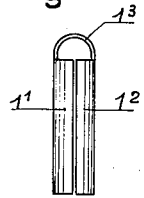
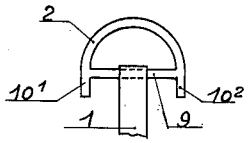
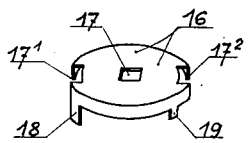
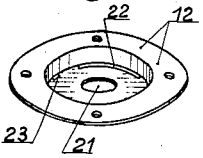
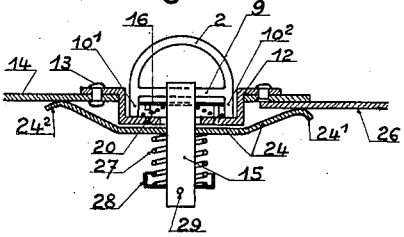
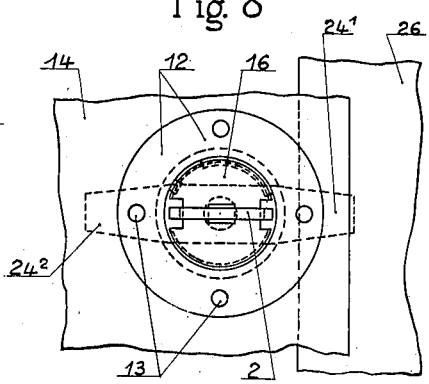
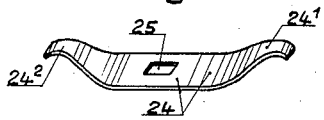
Jacques F. G. Chobert: INVENTOR;
By Smith, Michael & Gardiner, Attys.

Aug. 13, 1935. J. F. G. CHOBERT 2,011,472
FASTENING AND ASSEMBLING DEVICE
Filed May 24, 1934 3 Sheets-Sheet 2
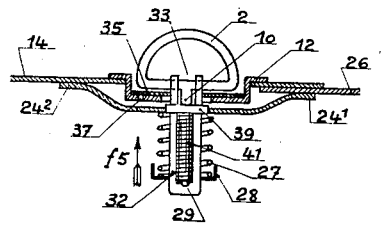
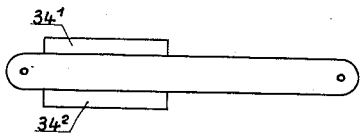
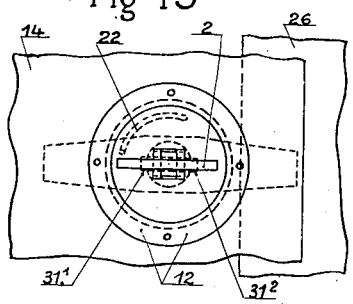
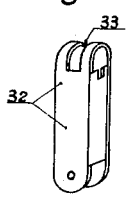
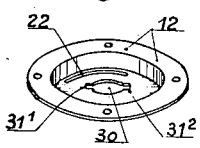
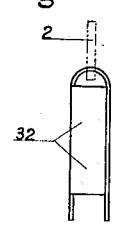
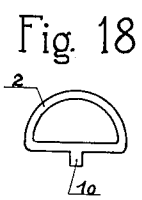
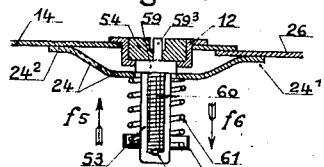
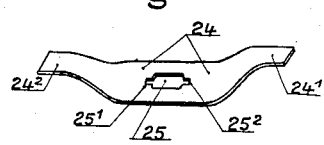
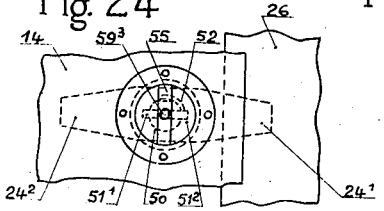
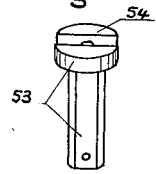
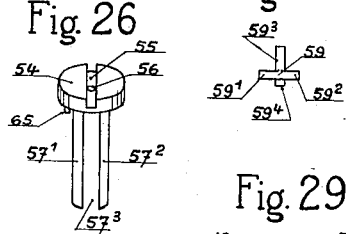
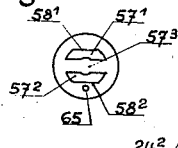
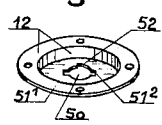
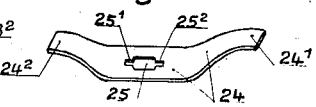
Jacques F. G. Chobert, INVENTOR;
By Smith, Michael & Gardiner, Attys.

Aug. 13, 1935.    J. F. G. CHOBERT    2,011,472
FASTENING AND ASSEMBLING DEVICE
Filed May 24, 1934    3 Sheets-Sheet 3

Jacques F.G. Chobert, INVENTOR;
By Smith, Michael and Gardiner, Attys.

Patented Aug. 13, 1935

2,011,472

UNITED STATES PATENT OFFICE 2,011,472

FASTENING AND ASSEMBLING DEVICE

Jacques Francois Gabriel Chobert,
Saint-Etienne, France

Application May 24, 1934, Serial No. 727,374
In France May 29, 1933

20 Claims. (Cl. 24—221)

The present invention relates to fastening and assembling devices for doors, partitions, floors and like structures, more particularly employed on vehicles such as aeroplanes, automobiles and the like.

According to the invention there is provided a fastening device for securing together two overlapping elements by pressing over-lapping surfaces of the said elements into contact with one another, comprising in combination a stem arranged to extend through at least one of said elements, a manually operable device disposed on the free end of said stem and arranged to be displaced relatively thereto, and a yieldingly controlled locking device operatively connected to the stem and arranged to be released, upon the displacement of the said manually operable device, from a position where it locks the said stem against rotation.

According to one embodiment of the invention the member forming the stem is constituted by a band of metal which is folded and stamped so as to form both the hinge of a cap ring and also a tubular portion ensuring the guiding of this member in the orifice of the fixed portion of the structure.

According to another embodiment of the invention, the stem has a rectangular section which ensures the proper guiding of the device and at the same time ensures the rotating movement of the fastening members.

A feature of the invention relates to a fastening device, wherein a fastening catch is controlled by a rotatable stem mounted on the movable part of the structure, this catch being arranged to engage in an orifice in the fixed part of the structure and obtain support thereon after rotation thus ensuring the fastening of the movable part.

The invention will be hereinafter more particularly described with reference to the accompanying drawings, in which:—

Figure 1 is a view in elevation of a fastening device according to the invention.

Figure 2 is a plan view of the device illustrated in Figure 1.

Figure 3 is a view in elevation of a member forming a stem.

Figures 4 and 5 show the process of manufacturing the stem illustrated in Figure 2.

Figure 6 is a view in elevation of a cap ring mounted on the stem.

Figure 7 is a view in section of another fastening device according to the invention.

Figure 8 is a plan view of the device illustrated in Figure 7.

Figure 9 is a perspective view of a fastening cup illustrated in Figure 7.

Figure 10 is a perspective view of a locking washer.

Figure 11 is a view in perspective of a locking catch.

Figure 12 is a view in section of another fastening device according to the invention.

Figure 13 is a plan view of the device illustrated in Figure 12.

Figure 14 is a perspective view of the stem disclosed in Figure 12.

Figures 15 to 17 show the process of manufacture of the stem disclosed in Figure 14.

Figure 18 is a view in elevation of the cap ring of the stem.

Figure 19 is a view in elevation of a locking button.

Figure 20 is a perspective view of the fastening cup.

Figure 21 is a perspective view of the actuating washer.

Figure 22 is a view in perspective of the fastening catch.

Figure 23 is a view in section of another fastening device according to the invention.

Figure 24 is a plan view of the device illustrated in Figure 23.

Figures 25, 26 and 27 are two views in elevation and one view in section of the plug of the device illustrated in Figure 23.

Figure 28 is a view in elevation of the locking button.

Figure 29 is a view in perspective of the fixing cup.

Figure 30 is a view in perspective of the fastening bolt.

Figure 31:
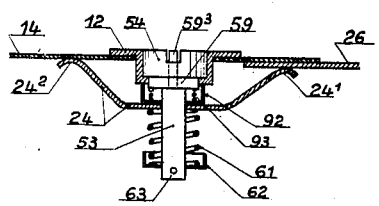
Figure 31 is a view in section of a fastening device in accordance with another embodiment of the invention.

The fastening device illustrated in Figures 1 to 6 comprises a fastening plug having a stem 1 and forming a hinge for the rocking cap ring 2. This stem 1 rotates in an orifice 3 in the fixed part 4 of the structure, whilst the rocking cap ring 2 extends through a locking cup 5. A compression spring 6 constantly forces the stem in the direction $f^1$. The spring 6 bears at one end thereof against the fixed part 4 of the structure and at the other end thereof against a ring 7 which is secured on the free extremity of the stem 1 by means of a pin 8.

The stem 1 of the plug is of tubular shape to enable it to be efficiently guided during the movements of rotation and sliding in the orifice 3. This stem 1 at the upper end thereof is of rectangular section and the locking cup 5 arranged to be rotated by the stem 1 is fitted on this portion of rectangular section.

The stem 1 is preferably made by starting with a stamped band of metal plate (Figure 4), rolling it at each of extremities $1^1$, $1^2$ thereof (Figure 5) and then folding to the position shown in Figure 3 so as to obtain a tubular body and also a bearing $1^3$ in which is inserted the cross bar 9 of the cap ring 2 (Figure 6). The upper part of the plug shank is of rectangular section to enable the locking cup 5 to be actuated.

Furthermore, the cap ring 2 is provided with two projections $10^1$, $10^2$, so that when the ring 2 is rotated from a position parallel to the fixed part 4 to a position at right angles thereto, the two projections $10^1$, $10^2$ act in the manner of an eccentric cam by bearing on the locking cup 5 and raise the whole of the plug by the height of these projections $10^1$, $10^2$ at the same time compressing the spring 6.

The surface 11 of the door is thus freed from the locking cup 5 and can move in the free space created by the lifting movement of the projection $10^1$, $10^2$. The plug by this simple rocking movement is thus unlocked and the bar 9 thereof is raised above the surface 11 of the door.

It is now sufficient merely to rotate the plug to bring the ring 2 parallel to the opening made in the door 11 so that this ring 2 can pass through this opening and thus free the door.

This arrangement of the projections $10^1$ and $10^2$ allows the usual tractive movement to be dispensed with and consequently the length of the plug can be reduced, since the releasing of the device is effected by a simple rotational movement. Furthermore, the arrangement permits a powerful spring 6 to be employed without it being necessary to exert any great effort when releasing the device.

In the embodiment just described it has been assumed that the fastening device mounted on one of the parts of the structure to be connected together effects the fastening of the other part thereto by the engagement of the head of the plug in an oblong orifice made in this other part and by the rotation of the plug and the folding of the head into the fastening position.

In the embodiment shown in Figures 7 to 11, the plug controls a locking nut which extends through an orifice in the fastening device, and which bears on a surface of this fastening device to secure it in position. To this end, the plug stem and the folding head or ring 2 are mounted in a cup 12 which is fixed by rivets 13 in the movable part 14 of the structure such as for example a door.

The ring 2 is provided with two projections $10^1$, $10^2$ and this ring is mounted on a rectangular tubular stem 15. This stem 15 extends through a locking disc 16 (Figure 10); this disc 16 is provided with a central hole 17 which is so shaped as to cause the disc to follow the rotary movements of the stem 15 but not the movements of translation.

The locking disc 16 has two apertures $17^1$ and $17^2$ which permit the passage of the projections $10^1$, $10^2$ of the ring 2 of the plug. The disc 16 is also provided with a long tongue 18 serving to limit the rotational movement of the plug to 90°, and with a short locking tongue 19 serving to lock the device in the closed position.

This locking disc 16 tends to be raised by a conical spiral spring 27 which becomes flat when compressed.

The plug stem 15 after extending through the disc 16 then extends through the cup 12 (Figure 9). This cup 12 has a central circular orifice 21 which permits freely the movements of rotation and of translation of the plug stem 15, and has furthermore, in the bottom thereof a long slot 22 which limits the movement of the tongue 18 of the locking disc 16, and a small orifice 23 into which the locking tongue 19 extends in the closed position.

The plug stem 15 then extends through a rotatable fastening catch 24 (Figure 11) provided in the centre thereof with a rectangular orifice 25 which accommodates the plug stem 15. The extremity $24^1$ of the locking catch 24 is curved and rounded so as to serve as a slope and facilitate the engagement thereof behind the surface of the fixed part 26 of the structure. The other extremity $24^2$ which transmits the reaction of the fastening nose $24^1$ to the surface of the door 14 is simply flat.

All the members disposed on the plug stem 15 are pressed together by means of a spring 27 which is maintained compressed by a centring ring 28 retained in position by a pin 29 passing through the end of the plug stem 15.

The device operates in the following manner:

In the closed position, the plug ring 2 is folded into the cup 12; the locking catch 24 bears with the extremity $24^1$ thereof on the inner surface of the fixed part 26 of the structure, while the other extremity $24^2$ of this bolt 24 bears on the door 14 of the structure. The spring 27 tends, furthermore, to hold the door 14 against the fixed part 26. In the closed position, the locking disc 16 under pressure from the plug ring 2, compresses its spring 20 and bears against the bottom of the cup 12 so that the short locking tongue 19 extends into the small orifice 23 of the cup 12.

In this closed position the catch 24 cannot rotate as it is prevented by the tongue 19 which connects the plug stem 15 with the fixed cup 12.

To open the door 14, the plug ring 2 (Figure 7) is rotated to a position at right angles to the surface of the door 14. The projections $10^1$, $10^2$ acting as a cam, bear on the cup 12 and raise the plug stem 15, at the same time compressing the spring 27. The plug ring 2 liberates the locking disc 16 which, under the action of the conical spring 20, rises by an amount slightly greater than the length of the short tongue 19. This tongue 19 is consequently disengaged from the orifice 23 of the cup 12, whilst the tongue 18 which is longer, remains engaged in the slot 22. The plug can now be rotated by a distance equal to the length of the slot 22 and the plug in rotating carries with it the catch 24 which leaves the surface 26 thus allowing the door 14 to be opened.

To close the door 14, the plug is rotated in the opposite direction, and this plug carries with it the catch 24 which by virtue of the rounded extremity 24¹ thereof is enabled to engage behind the surface 26 in spite of the thickness of this surface. The plug in rotating carries with it the disc 16 and the latter brings its locking tongue 19 above the orifice 23 of the fixed cup 12 at the end of the rotation.

When the plug ring 2 is folded over, the projections 10¹, 10² permit the spring 27 to extend, the disc 16 is applied against the bottom of the cup 12 and the tongue 19 engages in the orifice 23, thus locking the device in the closed position.

In the embodiment illustrated in Figures 12 to 22, the fastening device also includes a fixing cup 12 in which is arranged the plug provided with a ring 2. This ring 2 carries a central projection 10. The cup 12 (Figure 20) fixed on the door 14 is provided at the centre thereof with a circular orifice 30 which is extended laterally by means of two notches 31¹, 31² and is also provided with an arcuate slot 22.

The ring 2 which is provided with the central projection 10 is mounted on a rectangular tubular member 32 (Figure 14) forming the stem of the plug. This member 32 has a slot 33 which allows the projection 10 of the ring 2 to have free play.

The tubular member 32 of rectangular cross-section is conveniently made by commencing with a shaped metal band (Figure 15). The slot 33 is punched in the band and the wings 34¹, 34² are turned up at right angles to the main portion of the surface to bring the band into the form shown in Figure 16. The ring 2 is then fitted on the band and the two extremities are finally folded to the position shown in Figure 17.

The plug stem 32 first extends through a washer 35 controlling the distance of travel (Figure 21) which is provided with a rectangular orifice 36 and with a stop projection 37. This washer 35 is forced by the plug ring 2 to the bottom of the fixed cup 12, the projection 37 engaging in the arcuate slot 22 of the cup 12 and thus restricting the arcuate distance of travel of the plug.

The plug stem 32 extends through the cup 12 and then extends through the fastening catch 24 (Figure 22). This catch 24 is provided at the centre thereof with a rectangular orifice 25 through which the plug stem 32 extends and this rectangular orifice 25 is extended on each side by means of small notches 25¹, 25² which permit the free passage of a locking member 39 (Figure 19).

This locking member 39 is introduced into the plug stem 32 so as to engage with slots therein and is provided with two lateral projections 40¹ and 40². The member 39 is actuated by a small spiral spring 41 which is inserted in the hollow stem 32 and which tends to press constantly the member 39 in the direction $f^5$ to engage the projections 40¹ and 40² in the notches 31¹ and 31² of the cup 12.

In the closed position, the locking member 39 is rigid with the cup 12 through the intermediation of the two projections 40¹, 40² which are engaged in the notches 31¹ and 31² of the fixed cup 12. The catch 24 cannot rotate since it is rigid with the stem 32 which is itself rigid with the cup 12 through the locking member 39.

When the ring 2 is raised, the central projection 10 bears on the locking member 39 and causes it to slide in the opposite direction to that indicated by the arrow $f^5$ against the action of the helical spring 41. The member 39 is thus disengaged from the fixed cup 12, so that the plug is able to rotate freely and carry with it the catch 24. The catch when rotated leaves the wall of the aeroplane or like structure and permits the door to open, the turn of the plug being limited, for example, to a quarter revolution by the projection 37 on the washer 35 sliding in the slot 22 of the fixed cup 12.

To close the device, the plug is rotated in the opposite direction and carries with it the catch 24 which, by virtue of the rounded end 24¹ thereof can readily engage behind the wall of the structure. At the end of the travel, the plug carries the projections 40¹, 40² of the locking member 39 to a position opposite the notches 31¹, 31², of the cup 12, while the small spring 41 tends to cause this member to lift in the direction of the arrow $f^5$. As soon as the ring 2 is rotated to a position parallel to the surface 14, the central projection 10 thereof liberates the locking member 39 and this member rises in the direction of the arrow $f^5$. The member 39 thus enters again into the notches 31¹ and 31² and prevents the rotational movement of the device.

The fastening devices already described comprise a plug with a rocking ring and have the disadvantage that a fairly large external diameter is necessary to permit this rocking ring to be recessed in the cup. This is disadvantageous from the point of view of appearance and, in certain cases, is disadvantageous from the aerodynamic point of view.

The embodiment illustrated in Figures 23 to 30 permits this defect to be obviated. The device comprises essentially a cup 12 (Figure 29) which serves for fixing the device on, for example, the door 14, and which is provided with a cylindrical orifice 50 which is extended by means of two rectangular notches 51¹ and 51² and, by a small cylindrical notch 52 of a length equal to an arc of 90°.

The plug 53 (Figures 25 to 27) is constituted by a single piece and is provided with a head 54 of a thickness equal to the depth of the cup 12, so that the top of the head 54 comes flush with the edge of this cup and entirely fills up the hollow part of the cup which is of small diameter. This head 54 is provided with a slot 55 and a small central orifice 56 opening into the slot 55.

The plug stem is formed by two parallel branches 57¹ and 57² having flat surfaces 58¹ and 58² and separated by a free space 57³.

A locking member 59 (Figure 28) is disposed in the free space 57³ between the limbs 57¹ and 57² of the plug stem. This locking member 59 has, firstly a piece 59³ which engages in the orifice 56 of the plug head 54 and secondly a boss 59⁴ which serves to centre a spring 60 disposed between the limbs 57¹ and 57² of the stem and which presses the locking member 59 in the direction of the arrow $f^5$.

The locking catch 24 (Figure 30) accommodates the limbs 57¹ and 57² of the stem and this catch 24 is rotated by the flat parts 58¹ and 58² of the limbs 57¹ and 57². A spring 61 held by a pin 62 through the intermediary of a stop ring 61 urges the plug in the direction indicated by the arrow $f^6$.

In the closed position, the catch 24 at the extremity 24¹ thereof bears against the inner surface of the fixed structure and the other extremity 24² bears against the door. This bolt 24 which is controlled by the spring 61 tends to press the door 14 against the outer surface of the fixed structure. In this position, the locking member 59, which is controlled by the small spring 60, engages by the two projections 59¹ and 59² in the notches 51¹ and 51² of the cup 30. The catch 24 is thus made integral with the cup 12 through the intermediary of the plug stem and the locking member 59 and this catch 24 consequently cannot rotate.

To open the device, either a coin or a screwdriver is used and this is introduced into the slot 55 of the plug head 54 in such a manner that it displaces the shank 59³ of the locking member 59. The latter slides in the opposite direction to that indicated by the arrow $f^5$ and disengages the projections 59¹ and 59²˙ thereof from the notches 51¹ and 51² of the fixed cup 12. A movement of rotation is then imparted to the plug 53, thus unlocked from the cup 12 and the plug 53 carries with it the catch 24 which leaves the fixed wall of the structure so that the door can be opened. The rotational movement of the plug 53 is limited by a raised stop 65 disposed under the head 54 and which slides in the arcuate slot 52 of the fixed cup 12.

To effect the closing movement, a screwdriver or a coin is again used, and this is inserted in the slot 55 for the purpose of rotating the head 54 in a direction reverse to the direction of the opening movement.

The catch 24 engages with the inner surface of the fixed wall and at the end of the movement the projections 59¹ and 59² of the locking member 59 are exactly under the notches 51¹ and 51² of the cup 12. As soon as the screwdriver or coin is removed from the slot 55 of the head 54, the locking member 59 slides in the direction indicated by the arrow $f^5$ and the projections 59¹ and 59² thereof engage in the notches 51¹ and 51² of the cup 12 and hold the device in the closed position.

In the embodiment illustrated in Figure 31, a small dish member 92 is located between the locking member 59 and the catch 24. In this dish 92 is disposed a small helical spring 93. The dish 92 has an inner diameter somewhat greater than the total width of the locking member 59 so that this member 59 can slide freely inside the dish 92 under the action of the spring 93. The remainder of the apparatus illustrated in this figure is identical with the apparatus already described with reference to Figures 23 to 30 and is indicated by the same reference numerals.

Figure 36:
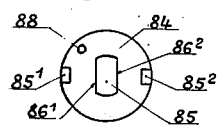

The device already described with reference to Figures 23 to 30, necessitates for the manipulation thereof the use of a coin or a tool such as a screwdriver. The device illustrated in Figures 32 to 37 is so constructed that it is not necessary to employ a coin or a tool to effect the actuation thereof. The device comprises a fixed cup 12 (Figure 37) having at the centre thereof a circular orifice 80. An arcuate slot 81 to limit the extent of rotation of the plug is also provided in the cup 12 together with two holes 82¹ and 82². The cylindrical plug has a head 84 and a cylindrical extension 85 provided with flats 86¹ and 86² (Figure 36). The head 84 is provided with two grooves 85¹ and 85² disposed diametrically opposite each other. These grooves are not formed over the whole thickness of the head 84 but leave at the upper end thereof a portion of the head of about 1 mm. thickness which forms a stop.

Figure 32:
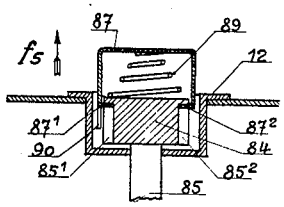
Figures 32 and 33 are two views in section illustrating two different positions of another fastening device in accordance with a further embodiment of the invention.
Figure 34:
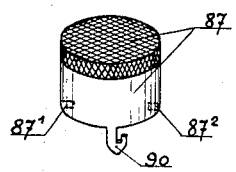
Figure 34 is a perspective view of a push button.
Figure 33:
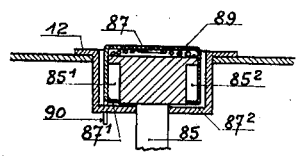
Figure 35:
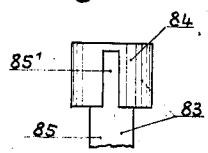
Figures 35 and 36 are side and plan views respectively of the plug.

In these grooves 85¹ and 85² engage two folded-over claws 87¹ and 87² of a hollow push button 87 (Figure 34). This push button 87 which covers the head of the plug 84 is forced continuously in the direction indicated by the arrow $f^5$ by a conical spring 89 located between the push button 87 and the head 84 (Figure 32). Furthermore, the upper periphery and flat surface of the push button 87 are milled in order that the latter may be manipulated simply by adhesion.

In the open position (Figure 32) the push button 87 rises above the upper surface of the cup 12. It is now possible to rotate the plug by means of a finger in order to close the device. During the rotating movement, the push button 87 by means of the two folded claws 87¹ and 87² disposed in the grooves 85¹ and 85², rotates the head 84 of the plug and consequently the plug stem 85 and the catch 24 (not shown) integral with the stem 85.

The arcuate movement of the plug 84 is limited by a projection 88 which is carried on the head 84 (Figure 36) and which slides in the slot 81 of the fixed cup 12.

Figure 37:
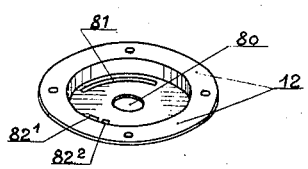
Figure 37 is a perspective view of the fixing cup.

After rotation of the button 87 the catch 24 is actuated but the fastening is not locked and the button is not hidden. In the present position of the plug and of the catch, a locking hook 90 carried by the milled button (Figure 34) is above the hole 82¹ of the fixed cup 12 (Figure 37).

The button 87 is depressed and slides in the reverse direction to that indicated by the arrow $f^5$, thus compressing the spring 89. The locking hook 90 owing to the pointed shape thereof causes the button 87 to rotate slightly in such a manner that this hook 90 passes into the hole 82¹. By means of the thumb the button 87 is now slightly rotated and when the pressure on the button is released, this rises slightly and the locking hook 90 hooks on to the small bridge formed between the holes 82¹ and 82² of the fixed cup 12. In this position the device can no longer rotate and the upper surface of the button 87 is on a level with the surface on which the device is fixed.

To open the device, the upper surface of the button 87 is pressed with the thumb. This pressure disengages the hook 90 and then a slight movement of rotation is given to the button to permit the hook to lift out through the hole 82¹. The button 87 thus liberated slides in the direction of the arrow $f^5$ and projects out of the cup 12 and may then be gripped for the purpose of turning the plug.

Figure 38:
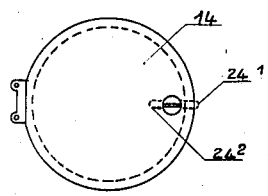
Figures 38 and 39 show in elevation two different methods of mounting the fastening devices on the parts of the structure which are to be connected together.
Figure 39:
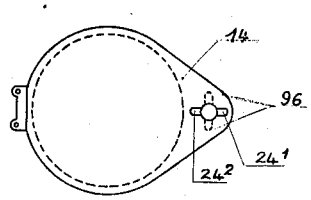

In the embodiments of the invention described with reference to Figures 7 to 37, it has been assumed that the device is mounted on the door (Figure 38) in such a manner that only one extremity 24¹ of the catch 24 comes into engagement with the fixed wall of the aeroplane structure or the like. Both the extremities 24¹ and 24² may however, be made to come into engagement with the wall, as illustrated in Figure 39. This necessitates the making of a rectangular orifice 96 in the wall or surface on which the door is secured. This orifice 96 allows the passage of the locking bolt 24 when the latter is parallel thereto. The bolt 24 after being turned through a quarter of a complete revolution rests with the two extremities 24¹ and 24² thereof on the fixed wall or surface.

This method of fastening necessitates the making of the opening 96 but nevertheless presents numerous advantages. It firstly permits a very short catch, exceeding only by 2 to 3 mm. the small diameter of the orifice 96, to be employed. Secondly, the catch bears with the two extremities thereof on the fixed surface or wall instead of having one extremity supported on the fixed surface or wall and the other on the door. Thirdly, as the cup or plug stem enters into an orifice bored in the fixed wall the door is prevented from drawing back, due to excessive strains, sufficiently for the bolt to slip past the edge of the fixed wall.

The fastening devices hereinbefore described are intended in particular for closing folding hatches, inspection doors and for fixing ordinary or fireproof partitions, floors and the like in aeroplanes, automobiles, tanks, locomotives, submarines, ships and the like.

The fastening devices ensure reliable securing by taking up all the free play and their safety locking feature prevents them opening inopportunely under the effect of vibration. The fastening devices according to the invention are of simple construction and are reliable in operation, and furthermore, they are light in weight which makes them convenient for use in aeronautical constructions.

What I claim and desire to secure by Letters Patent of the United States is:—

1. A fastening device for securing together two overlapping elements by pressing overlapping surfaces of the said elements into contact with one another, comprising in combination a stem arranged to extend through at least one of said elements, a manually operable device disposed on the free end of said stem and arranged to be displaced relatively thereto, and a yieldingly controlled locking device operatively connected to the stem and arranged to be released, upon the displacement of the said manually operable device, from a position where it locks the said stem against rotation.

2. A fastening device for securing together two overlapping elements, comprising in combination a stem arranged to extend through at least one of said elements, a manually operable device pivotally mounted on the free end of said stem, at least one projection on said device, and a yieldingly controlled locking device operatively connected to said stem and arranged to be engaged by the said projection, when the said manually operable device is rotated with respect to the stem, and thereby released from a position where it locks the said stem against rotation.

3. A fastening device for securing together two overlapping elements, comprising in combination a stem arranged to extend through at least one of said elements, a manually operable device pivotally mounted on the free end of said stem, at least one projection on said device, and a yieldingly controlled locking device operatively connected to said stem and arranged to be engaged by the said projection, when the said manually operable device is rotated with respect to the stem, for the purpose of effecting relative movement between the stem and the said yieldingly controlled device whereby the latter is released from a position where it locks the said stem against rotation.

4. A fastening device for securing together two overlapping elements, comprising in combination a stem arranged to extend through at least one of said elements, a ring extending through an aperture in the free end of said stem and arranged to be rotated relatively thereto, at least one projection on said ring disposed in the plane thereof, and a yieldingly controlled locking device operatively connected to said stem and arranged to be engaged by said projection when the said ring is rotated from a position perpendicular to the axis of the stem to a position parallel to the axis of the stem, and thereby released from a position where it locks the said stem against rotation.

5. A fastening device for securing together two overlapping elements, comprising in combination a stem arranged to extend through at least one of said elements, a "D" shaped ring the straight portion of which extends through an aperture in the free end of said stem and which is arranged to be rotated relatively thereto, at least one projection on the straight portion of said ring disposed in the plane thereof, and a yieldingly controlled locking device operatively connected to said stem and arranged to be engaged by said projection, when the said ring is rotated from a position perpendicular to the axis of the stem to a position parallel to the axis of the stem, and thereby released from a position where it locks the said stem against rotation.

6. A fastening device for securing together two overlapping elements, comprising in combination a stem arranged to extend through at least one of said elements, a ring extending through an aperture in the free end of said stem and arranged to be rotated relatively thereto, means comprising projections on said ring for displacing the said stem axially against the action of a spring in a direction perpendicular to the surfaces of the two overlapping elements, a yieldingly controlled locking device operatively connected to said stem and arranged upon the axial displacement of the stem to be released from a position where it locks the said stem against rotation, the release of the fastening device being then effected without the necessity of applying force to hold the stem in the displaced position during rotation thereof.

7. A fastening device for securing together two overlapping elements, comprising in combination a stem arranged to extend through at least one of said elements, a manually operable device disposed on the free end of said stem and arranged to be displaced relatively thereto, a pin member carried by the stem in an axial slot, a spring disposed in said slot and arranged to maintain the pin member in a position where it locks the said stem against rotation, and means included in said manually operable device for displacing the pin member from the locking position against the action of the spring, upon the displacement of the said manually operable device.

8. A fastening device for securing together two overlapping elements, comprising in combination a stem arranged to extend through at least one of said elements, a cylindrical push button disposed on the free end of the stem and arranged to be displaced in an axial direction on said stem against the action of a spring and a yieldingly controlled locking device operatively connected to the stem and arranged to be maintained by said push button in a position where it locks the stem against rotation.

9. A fastening device for securing together two overlapping elements, comprising in combination a stem arranged to extend through at least one of said elements, a cylindrical push button disposed on the free end of the stem and arranged to be displaced in an axial direction on said stem against the action of a spring, a hook member disposed on said push button and arranged to engage in an orifice in a member on which the stem is mounted when the push button is given a slight rotational movement and thus maintain the latter in the displaced position and a yieldingly controlled locking device operatively connected to the stem and arranged to be maintained by said push button in a position where it locks the stem against rotation.

10. A fastening device for securing together two overlapping elements, comprising in combination a stem arranged to extend through at least one of said elements, a manually operable device disposed on the free end of said stem and arranged to be displaced relatively thereto, a yieldingly controlled locking device operatively connected to the stem and arranged to be released, upon the displacement of the said manually operable device, from a position where it locks the said stem against rotation, and a locking device disposed on said stem which is arranged to maintain the two elements in locking engagement and which is rotatable with the stem through a predetermined angle from a locking position to an unlocking position when the said yieldingly controlled device is released.

11. A fastening device for securing together two overlapping elements, comprising in combination a stem arranged to extend through at least one of said elements, a manually operable device disposed on the free end of said stem and arranged to be displaced relatively thereto, a yieldingly controlled locking device operatively connected to the stem and arranged to be released, upon the displacement of the said manually operable device, from a position where it locks the said stem against rotation, and a double armed catch disposed on said stem the two arms of which are spring urged into engagement with the two elements for the purpose of securing the latter together and which are rotatable with the stem through a predetermined angle from a locking position to an unlocking position when the said yieldingly controlled device is released.

12. A fastening device for securing together two overlapping elements, comprising in combination a tubular member arranged to extend through at least one of said elements and to be displaced axially in a direction perpendicular to the surface thereof, a manually operable device disposed on the free end of said member and arranged to be moved relatively thereto to effect the axial displacement of the member and a yieldingly controlled locking device operatively connected to the stem and arranged to be released, upon the displacement of the said member, from a position where it locks the said stem against rotation.

13. A fastening device for securing together two overlapping elements, comprising in combination a stem arranged to extend through at least one of said elements, a manually operable device disposed on the free end of said stem and arranged to be displaced relatively thereto, and a pin member carried by the stem in an axial slot and arranged to be moved, upon the displacement of the said manually operable device, in said axial slot from a position where it locks the stem against rotation.

14. A fastening device for securing together two overlapping elements, comprising in combination a stem arranged to extend through at least one of said elements, a manually operable device disposed on the free end of said stem and arranged to be displaced relatively thereto, and a yieldingly controlled locking device disposed on the stem and arranged to be moved, upon the displacement of the said manually operable device, in a direction parallel to the axis of the stem from a position where it locks the said stem against rotation.

15. A fastening device for securing together two overlapping elements comprising in combination a stem arranged to extend through at least one of said elements and to be displaced axially in a direction perpendicular to the surfaces of said elements, a manually operable device disposed on the free end of said stem and arranged to be displaced relatively thereto to effect the axial displacement of the stem, and a disc carried on the stem and provided with a projection on the periphery thereof which is arranged to engage in an orifice in one of said elements for the purpose of locking the stem against rotation and to be released from said orifice when the stem is displaced in an axial direction.

16. A fastening device for securing together two overlapping elements comprising in combination a stem arranged to extend through at least one of said elements and to be displaced axially in a direction perpendicular to the surfaces of said elements, a manually operable device disposed on the free end of said stem and arranged to be displaced relatively thereto to effect the axial displacement of the stem, a disc carried on the stem and provided with a projection on the periphery thereof which is arranged to engage in an orifice in one of said elements for the purpose of locking the stem against rotation, and a spring arranged to release the projection from the said orifice when the stem is displaced in an axial direction.

17. A fastening device for securing together two overlapping elements, comprising in combination a stem arranged to extend through at least one of said elements, a manually operable device disposed on the free end of said stem and arranged to be displaced relatively thereto, a yieldingly controlled locking device operatively connected to the stem and arranged to be released, upon the displacement of the said manually operable device, from a position where it locks the said stem against rotation, a locking device disposed on said stem which is arranged to maintain the two elements in locking engagement and which is rotatable with the stem from a locking position to an unlocking position when the said yieldingly controlled device is released, and guiding means for limiting the extent of rotation of the stem and locking device.

18. A fastening device for securing together two overlapping elements, comprising in combination a stem arranged to extend through at least one of said elements, a manually operable device disposed on the free end of said stem and arranged to be displaced relatively thereto, a yieldingly controlled locking device operatively connected to the stem and arranged to be released, upon the displacement of the said manually operable device, from a position where it locks the said stem against rotation, a locking device disposed on said stem which is arranged to maintain the two elements in locking engagement and which is rotatable with the stem from a locking position to an unlocking position when the said yieldingly controlled device is released, and guiding means, for limiting the extent of rotation of the stem and locking device, comprising an arcuate slot disposed in a dish shaped member secured to one of the elements and a pin member disposed in said slot and carried by and rotatable with the stem.

19. A fastening device for securing together two overlapping elements, comprising in combination, a stem arranged to extend through at least one of said elements, a cup shaped member mounted flush with the surfaces of the elements, a ring normally disposed in said cup shaped member and extending through an aperture in the free end of said stem, at least one projection on said ring disposed in the plane thereof, and a yieldingly controlled locking device operatively connected to said stem and arranged to be engaged by said projection when the said ring is rotated from a position perpendicular to the axis of the stem where it lies within the cup to a position parallel to the axis of the stem, and thereby released from a position where it locks the said stem against rotation.

20. A fastening device for securing together two overlapping elements, comprising in combination a stem arranged to extend through at least one of said elements, a manually operable device disposed on the free end of said stem and arranged to be displaced relatively thereto, a yieldingly controlled locking device operatively connected to the stem and arranged to be released, upon the displacement of the said manually operable device, from a position where it locks the said stem against rotation, and a double armed catch comprising a blade mounted at the centre thereof on said stem the two arms of which are spring urged into engagement with the two elements for the purpose of securing the latter together and which are rotatable with the stem through a predetermined angle from a locking position to an unlocking position when the said yieldingly controlled device is released, at least one of the arms being curved at the end thereof to facilitate engagement with the surface of one of the elements.

JACQUES FRANCOIS GABRIEL CHOBERT.